United States Patent
Ko

(10) Patent No.: US 6,927,364 B2
(45) Date of Patent: Aug. 9, 2005

(54) HEATING COOKER

(75) Inventor: Yeong Cheol Ko, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/749,384

(22) Filed: Jan. 2, 2004

(65) Prior Publication Data

US 2004/0222208 A1 Nov. 11, 2004

(30) Foreign Application Priority Data

May 7, 2003 (KR) ................................ 10-2003-0028838

(51) Int. Cl.[7] .............................. A21B 1/26; A21B 3/04
(52) U.S. Cl. ......................... 219/400; 219/401; 126/20; 126/21 A
(58) Field of Search ............................... 219/400, 401; 126/20, 21 A, 22; 99/474, 476

(56) References Cited

U.S. PATENT DOCUMENTS

| | | | | |
|---|---|---|---|---|
| 4,123,969 A | * | 11/1978 | Abbate ....................... 219/401 |
| 4,509,412 A | * | 4/1985 | Whittenburg et al. .......... 126/20 |
| 4,554,864 A | * | 11/1985 | Smith et al. .................... 99/340 |
| 4,591,698 A | * | 5/1986 | Chang ......................... 219/400 |
| 5,519,188 A | * | 5/1996 | Yuichi et al. ................ 219/401 |
| 5,938,959 A | * | 8/1999 | Wang .......................... 219/401 |

FOREIGN PATENT DOCUMENTS

| JP | 06249445 A | * | 9/1994 |
|---|---|---|---|
| JP | 8-247473 | | 3/1995 |

* cited by examiner

*Primary Examiner*—Joseph Pelham
(74) *Attorney, Agent, or Firm*—Staas & Halsey LLP

(57) ABSTRACT

A heating cooker produces hot steam by boiling water in a cooking cavity thereof, and cooks food by use of the hot steam to prepare steamed food. The heating cooker has a cabinet to define a cooking cavity therein. A steaming vessel to contain food and water therein, is laid on a bottom wall of the cooking cavity. A heater is provided at the bottom wall of the cooking cavity to heat the bottom wall of the cooking cavity on which the steaming vessel is laid. Thus, the heater heats the water contained in the steaming vessel, so that the water is boiled to produce the hot steam.

14 Claims, 3 Drawing Sheets

HEATING COOKER

CROSS-REFERENCE TO RELATED APPLICATIONS

This application claims the benefit of Korean Application No. 2003-28838, filed May 7, 2003, in the Korean Intellectual Property Office, the disclosure of which is incorporated herein by reference.

BACKGROUND OF THE INVENTION

1. Field of the Invention

The present invention relates, in general, to heating cookers and, more particularly, to a heating cooker which is capable of cooking food with hot steam.

2. Description of the Related Art

Generally, heating cookers are cooking machines which cook foods in cooking cavities thereof with heated air. In the heating cookers, the cooking of the food is accomplished through several heat transfer phenomena like, for example, (1) "convection", which is the transfer of heat to the food by a circulation or movement of air heated by a heater in a cooking cavity, (2) "radiation", which is a process in which heat is emitted from both the heater and a heated inner surface of the cooking cavity and transmitted through the air to be absorbed by the foo, and (3) "conduction", which is the transfer of heat from the heated air to the food through a container which contains the food therein.

Conventional heating cookers are advantageous in that the cooking of food in the heating cookers is accomplished by the direct transfer of heat to the food through "convection" and "radiation", so that the cooking is finished within a short period of time, and the cooking of several kinds of foods simultaneously, is possible. However, the cooking of food in the conventional heating cookers is accompanied by an evaporation of moisture laden in the food to steam. Thus, the conventional heating cookers are not suitable for preparation of steamed food which requires addition of water to the food during steaming.

SUMMARY OF THE INVENTION

Accordingly, it is an aspect of the present invention to provide a heating cooker which is capable of producing hot steam by boiling water in a cooking cavity thereof, and cooking food with the hot steam to prepare steamed food.

Additional aspects and advantages of the invention will be set forth in part in the description which follows and, in part, will be obvious from the description, or may be learned by practice of the invention.

The foregoing and/or other aspects of the present invention are achieved by providing a heating cooker, including a cabinet to define a cooking cavity therein, a steaming vessel to contain food and water therein, the steaming vessel being laid on a bottom wall of the cooking cavity, and a first heater provided at the bottom wall of the cooking cavity to heat the bottom wall of the cooking cavity on which the steaming vessel is laid.

According to an aspect of the invention, the bottom wall of the cooking cavity is provided with a vessel seat to support the steaming vessel thereon, the vessel seat being provided at the bottom wall of the cooking cavity by depressing the bottom wall of the cooking cavity to a predetermined depth, with the first heater mounted to a lower surface of the bottom wall of the cooking cavity at a position to correspond to the vessel seat.

According to an aspect of the invention, the steaming vessel includes a lower vessel body closely laid on the bottom wall of the cooking cavity to contain the food and water therein, and a steaming plate seated in the lower vessel body to be held at an edge of the lower vessel body so that the steaming plate is spaced apart from a bottom of the lower vessel body, wherein the steaming plate has a structure to allow steam to pass the steaming plate, and a lid to close an open top of the lower vessel body.

According to an aspect of the invention, the heating cooker further includes a second heater provided in the cooking cavity to heat air in the cooking cavity.

According to an aspect of the invention, the heating cooker further includes a hot air circulation unit to circulate the air in the cooking cavity.

According to an aspect of the invention, the hot air circulation unit includes an air circulation fan installed in a fan chamber formed by recessing a rear wall of the cooking cavity, and a motor installed outside the cooking cavity to rotate the air circulation fan.

According to an aspect of the invention, a third heater is installed in the fan chamber at a predetermined position around the air circulation fan to heat the air discharged from the air circulation fan.

BRIEF DESCRIPTION OF THE DRAWINGS

The above and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
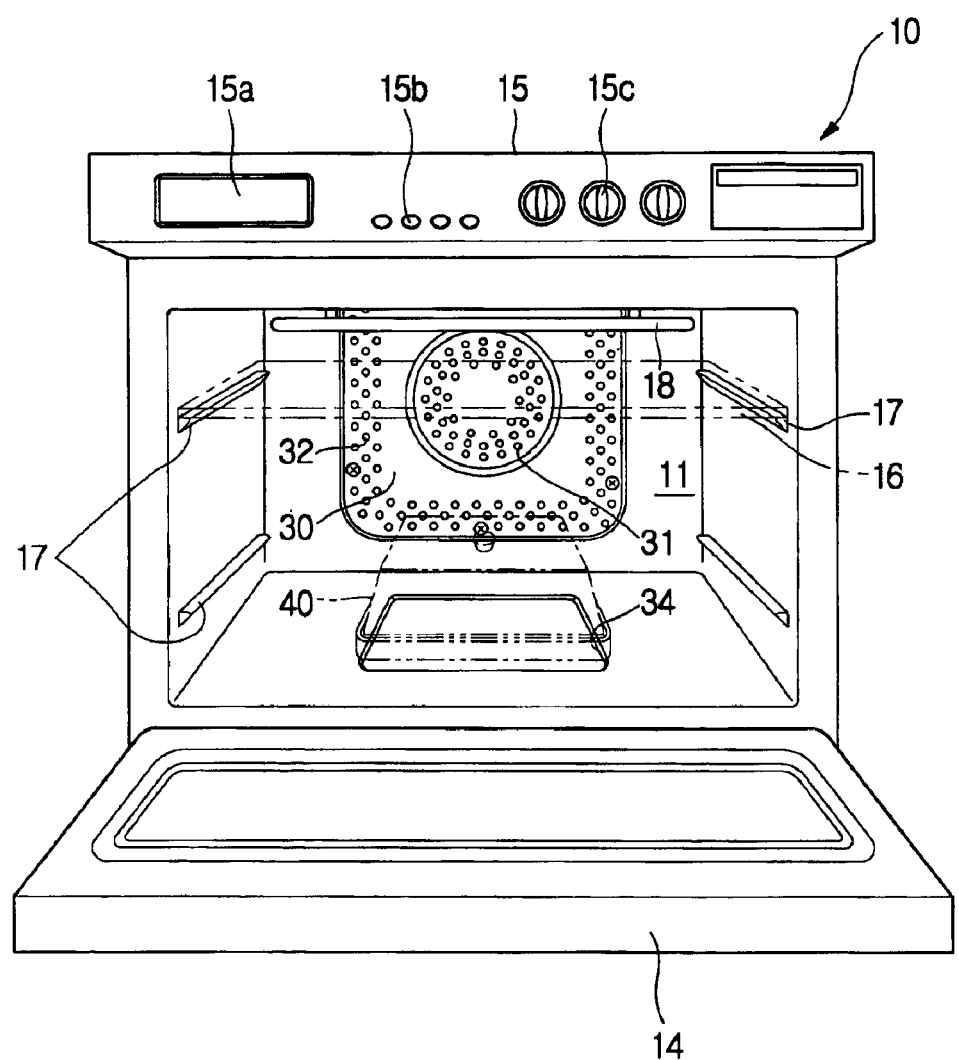
FIG. 1 is a front perspective view of a heating cooker, according to an embodiment of the present invention.

Reference will now be made in detail to the present preferred embodiments of the present invention, examples of which are illustrated in the accompanying drawings, wherein like reference numerals refer to like elements throughout.

Figure 2:
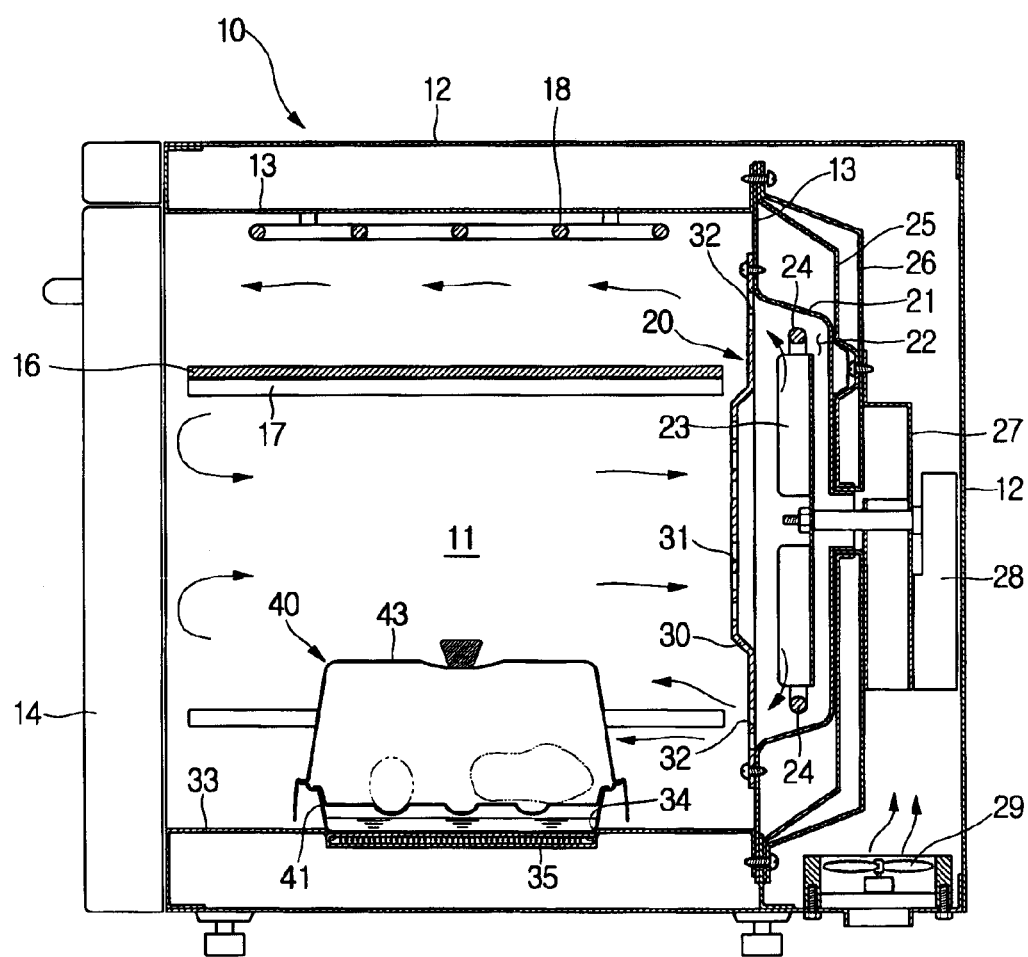
FIG. 2 is a side sectional view of the heating cooker of FIG. 1 to show an internal construction of the heating cooker.

FIGS. 1 and 2 are views of a heating cooker, according to an embodiment of the present invention. As shown in the drawings, the heating cooker according to the present invention is configured by a cabinet 10 which defines a cooking cavity 11 therein. The cabinet 10 has two casings, that is, an outer casing 12 and an inner casing 13. The outer casing 12 is made of a steel sheet, and defines an appearance of the cabinet 10. The inner casing 13, defining the cooking cavity 11 therein, is placed in the outer casing 12 with a gap maintained between the outer and inner casings 12 and 13. The cooking cavity 11, defined in the inner casing 13, is open at a front thereof to allow a user to put food into or take food out of the cooking cavity 11. The open front of the cooking cavity 11 is closed by a door 14 which is mounted by hinges to a lower edge of the cabinet 10 to rotate upward to close the cooking cavity 11 and swing downward to open the cooking cavity 11. A control panel 15 is provided on a front of the cabinet 10 at an upper portion above the door 14, and includes a display window 15a to display operating states of the heating cooker thereon, a variety of control buttons 15b, and a variety of control switches 15c.

A plurality of food racks 16 are provided at upper and lower sections in the cooking cavity 11 to support food therein during a cooking process. The food racks 16 are drawer-type racks, each of which is movably held on two guide rails 17 provided at inner surfaces of opposite sidewalls of the inner casing 13. The food racks 16 are thus drawn out of or into the cooking cavity 11, and may be removed from the cooking cavity 11, when necessary.

In the heating cooker of the present invention, a first heater 18 is installed at an upper section in the cooking cavity 11 to heat air in the cooking cavity 11. A hot air circulation unit 20 is provided at a rear wall of the cooking cavity 11 to circulate the hot air in the cooking cavity 11. In order to provide the hot air circulation unit 20 at the rear wall of the cooking cavity 11, the rear wall of the cooking cavity 11 is recessed in a predetermined area thereof to a predetermined depth, as shown in FIG. 2, thus forming a recessed rear wall 21 to define a fan chamber 22 therein. An air circulation fan 23 and a second heater 24 are installed in the fan chamber 22. The air circulation fan 23 circulates the air of the cooking cavity 11, while the second heater 24 heats the circulated air of the cooking cavity 11. The air circulation fan 23 is a centrifugal fan, in which the air is drawn into through a central space of the fan 23, and is discharged to the outside of a circumference of the fan 23 in radial directions. The second heater 24 is installed inside the fan chamber 22 at a predetermined position around the circumference of the air circulation fan 23 to effectively heat the air when the air is discharged from the fan 23 in radial directions.

First and second heat-shielding plates 25 and 26 are mounted to a rear end of the inner casing 13 at a position outside the recessed rear wall 21 of the cooking cavity 11 to intercept heat transmitted from the second heater 24 to the outside of the fan chamber 22. The first and second heat-shielding plates 25 and 26 are integrated into a single body with a thermal insulating space defined between the two heat-shielding plates 25 and 26. A drive motor 28 is installed outside the first and second heat-shielding plates 25 and 26 to rotate the air circulation fan 23. The drive motor 28 is held by a motor bracket 27 which is mounted to an outer surface of the second heat-shielding plate 26. A cooling fan 29 is installed at a lower portion of a space defined between the outer and inner casings 12 and 13 at the back of the cabinet 10, and cools the drive motor 28.

A chamber cover 30 is mounted to an open front of the fan chamber 22 to cover the air circulation fan 23 and the second heater 24 installed in the fan chamber 21. A plurality of air suction ports 31 are provided at a central area of the chamber cover 30, while a plurality of air distribution ports 32 are provided along an outside edge of the chamber cover 30. The hot air of the cooking cavity 11 is thus drawn into the fan chamber 22 through the air suction ports 21 due to a suction force of the air circulation fan 23 rotated in the fan chamber 22. In the fan chamber 22, the hot air is forced outward in the radial directions of the air circulation fan 23, and is heated again by the second heater 24. The hot air after being heated by the second heater 24 is distributed from the fan chamber 22 into the cooking cavity 11 through the air distribution ports 32 of the chamber cover 30.

Figure 3:
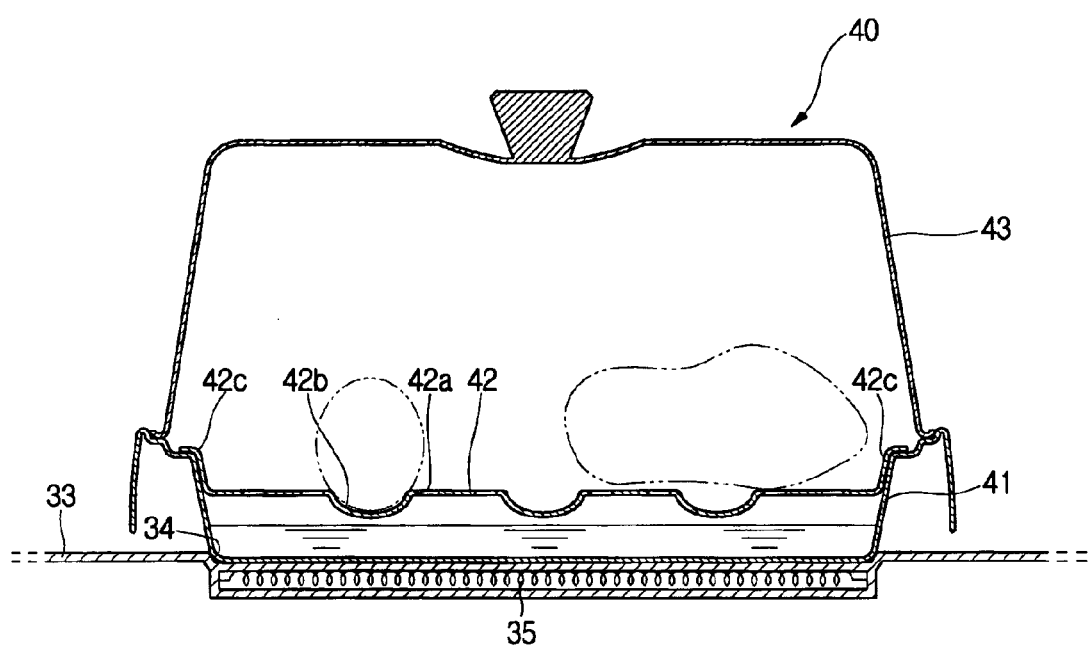
FIG. 3 is a sectional view of a steaming vessel installed in the heating cooker of FIG. 1.

As shown in FIGS. 1 through 3, the heating cooker according to the present invention also has a steaming vessel 40. The steaming vessel 40 is installed in the cooking cavity 11, and allows the user to cook food in the vessel 40 by use of hot steam when it is desired to prepare steamed food. In order to stably seat the steaming vessel 40 in the cooking cavity 11 at a predetermined position, a vessel seat 34 having a shape to correspond to a shape of a bottom of the steaming vessel 40 is provided at a bottom wall 33 of the cooking cavity 11 by depressing a predetermined area of the bottom wall 33 to a predetermined depth. A third heater 35 is mounted to a lower surface of the bottom wall 33 of the cooking cavity 11 at a position corresponding to the vessel seat 34, to heat the bottom of the steaming vessel 40 and boil water contained in the steaming vessel 40 to produce hot steam.

As shown in FIG. 3, the steaming vessel 40 includes a lower vessel body 41 which is open at a top thereof and contains water therein, a steaming plate 42 which is horizontally seated in an upper section of the lower vessel body 41, and a lid 43 which closes the open top of the lower vessel body 41.

In the steaming vessel 40, the lower vessel body 41 is open at the top thereof, with a bank part provided along an edge of the open top of the lower vessel body 41. The steaming plate 42 has an edge flange 42c along an edge thereof, so that the steaming plate 42 is horizontally seated in the upper section of the lower vessel body 41 by the edge flange 42c which is seated on the bank part of the lower vessel body 41. In such a case, the steaming plate 42 is seated in the lower vessel body 41 while being spaced apart from the bottom of the lower vessel body 41 containing water. The steaming plate 42 is provided with a plurality of steam holes 42a to allow the steam produced from the water in the lower vessel body 41 to pass the steaming plate 42. The steaming plate 42 also has a plurality of concave depressions 42b formed therein to a predetermined depth to stably seat therein roundish foods, such as eggs, without allowing the roundish foods to move on the steaming plate 42. The lid 43 is open at a bottom thereof, and is laid on the open top of the lower vessel body 41 to cover the food supported on the steaming plate 42.

The heating cooker of the present invention is operated as follows.

In order to cook food through a general-type cooking mode of the heating cooker, the food is laid on the food racks 16 in the cooking cavity 11, and a desired cooking mode is selected, prior to starting the operation of the heating cooker. When the operation of the heating cooker is started, the first and second heaters 18 and 24 are turned on. In addition, the air circulation fan 23 is rotated to circulate the air in the cooking cavity 11. Therefore, the air is heated by the first and second heaters 18 and 24 to produce hot air which circulates in the cooking cavity 11 by the force of the air circulation fan 23, thus cooking the food on the food racks 16. During the general-type cooking mode operation, the third heater 35 in addition to the first and second heaters 18 and 24 may be turned on to produce heat. When the first, second, and third heaters 18, 24 and 35 are turned on at the same time during the general-type cooking mode operation, as described above, the air in the cooking cavity 11 is more intensively heated to a higher temperature, thus cooking the food more quickly.

When the user wants to cook food through a steaming mode with the steaming vessel 40, the user pours a predetermined amount of water into the lower vessel body 41, and seats the steaming plate 42 in the upper section of the lower vessel body 41. Thereafter, the user lays the food on the steaming plate 42, and closes the open top of the lower vessel body 41 with the lid 43. The steaming vessel 40 containing the food is, thereafter, seated on the vessel seat 34 in the cooking cavity 11. In such a case, since the bottom of the steaming vessel 40 is in close contact with the vessel seat 34, the steaming vessel 40 is stably seated in the cooking cavity 11, without being undesirably moved.

After the steaming vessel 40 is seated on the vessel seat 34 in the cooking cavity 11, the third heater 35 starts to heat the water in the lower vessel body 41. The water is thus boiled to produce hot steam. The hot steam heats the food laid on the steaming plate 42, thus steaming the food to prepare desired steamed food. During the steaming mode operation of the heating cooker, the first and second heaters 18 and 24 in addition to the third heater 35 may be turned on. When the first, second, and third heaters 18, 24 and 35 are turned on at the same time during the steaming mode operation, as described above, the hot air in the cooking cavity 11 comes into contact with an outer surface of the steaming vessel 40, thus steaming the food in the steaming vessel 40 more quickly.

As apparent from the above description, the present invention provides a heating cooker, in which a heater is installed at a lower surface of a bottom wall of a cooking cavity to heat a steaming vessel to produce hot steam from water contained in the steaming vessel during a steaming mode operation. The hot steam heats food in the steaming vessel, allowing a user to easily prepare steamed food.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A heating cooker, comprising:
    a cabinet to define a cooking cavity therein;
    a steaming vessel to contain food and water therein, the steaming vessel being laid on a vessel seat depressed into a bottom wall of the cooking cavity to a predetermined depth; and
    a first heater provided at the bottom wall of the cooking cavity to correspond to the depth of the vessel seat so as to heat the bottom wall of the cooking cavity on which the steaming vessel is laid.

2. The heating cooker according to claim 1, further comprising
    a second heater provided in the cooking cavity to heat air in the cooking cavity.

3. The heating cooker according to claim 2, further comprising:
    a hot air circulation unit to circulate the air in the cooking cavity.

4. The heating cooker according to claim 3, wherein the hot air circulation unit comprises:
    a fan chamber formed by recessing a rear wall of the cooking cavity;
    an air circulation fan installed in the fan chamber; and
    a motor installed outside the cooking cavity to rotate the air circulation fan.

5. The heating cooker according to claim 4, further comprising:
    a third heater installed in the fan chamber at a predetermined position around the air circulation fan to heat the air discharged from the air circulation fan.

6. The heating cooker according to claim 5, wherein the air circulation fan is a centrifugal fan in which air is drawn into through a central space of the air circulation fan, and is discharged to an outside of a circumference of the air circulation fan in radial directions.

7. The heating cooker according to claim 5, further comprising:
    first and second heat-shielding pates mounted to an inner casing of the cabinet at a position outside the recessed rear wall of the cooking cavity to intercept heat transmitted from the third heater to an outside of the fan chamber.

8. The heating cooker according to claim 7, wherein the first and second heat-shielding plates are integrated into a single body with a thermal insulating space defined between the first and second heat-shielding plates.

9. The heating cooker according to claim 7, further comprising:
    a drive motor installed outside of the first and second heat-shielding plates to rotate the air circulation fan;
    a motor bracket mounted to an outer surface of the second heat-shielding plate to hold the drive motor; and
    a cooling fan installed at a space defined between the inner casing and an outer casing at the back of the cabinet to cool the drive motor.

10. The heating cooker according to claim 6, further comprising:
    a chamber cover mounted to an open front of the fan chamber to cover the air circulation fan and the third heater;
    a plurality of air suction ports provided at a central area of the chamber cover; and
    a plurality of air distribution ports provided along an outside edge of the chamber cover, wherein,
    hot air in the cooking cavity is drawn into the fan chamber through the air suction ports due to a suction force of the air circulation fan, and is distributed from the fan chamber into the cooking cavity through the air distribution ports of the chamber cover.

11. A heating cooker, comprising:
    a cabinet to define a cooking cavity therein;
    a steaming vessel to contain food and water therein, the steaming vessel being laid on a bottom wall of the cooking cavity; and
    a first heater provided at the bottom wall of the cooking cavity to heat the bottom wall of the cooking cavity on which the steaming vessel is laid, wherein the steaming vessel includes;
    a lower vessel body closely laid on the bottom wall of the cooking cavity to contain the water therein,
    a steaming plate seated in the lower vessel body to be held at an edge of the lower vessel body so that the steaming plate is spaced apart from a bottom of the lower vessel body, the steaming plate having a structure to allow steam to pass the steaming plate, and
    a lid to close an open top of the lower vessel body.

12. The heating cooker according to claim 11, further comprising:
    a bank part provided along an edge of an open top of the lower vessel body.

13. The heating cooker according to claim 12, wherein the steaming plate has an edge flange along an edge thereof, so that the steaming plate is horizontally seated in the lower vessel body by the edge flange, which is seated on the bank part of the lower vessel body.

14. A heating cooker having a cabinet to define a cooking cavity therein, comprising:
    a steaming vessel to contain food and water therein, the steaming vessel being laid on a vessel seat depressed into a wall of the cooking cavity to a predetermined depth; and
    a first heater provided at the wall of the cooking captivity to correspond to the depth of the vessel seat so as to produce hot steam from the water contained in the steaming vessel.

* * * * *

UNITED STATES PATENT AND TRADEMARK OFFICE
CERTIFICATE OF CORRECTION

PATENT NO. : 6,927,364 B2
DATED : August 9, 2005
INVENTOR(S) : Yeong Cheol Ko et al.

It is certified that error appears in the above-identified patent and that said Letters Patent is hereby corrected as shown below:

<u>Column 5,</u>
Line 56, change "pates" to -- plates --.

<u>Column 6,</u>
Line 34, change "includes;" to -- includes --.
Line 58, change "captivity" to -- cavity --.

Signed and Sealed this

Fourth Day of April, 2006

JON W. DUDAS
*Director of the United States Patent and Trademark Office*